United States Patent
Ihle et al.

(10) Patent No.: US 10,202,935 B2
(45) Date of Patent: Feb. 12, 2019

(54) SEGMENTED PISTON FOR INTERNAL COMBUSTION ENGINE

(71) Applicant: Hirschvogel Umformtechnik GmbH, Denklingen (DE)

(72) Inventors: Armin Ihle, Asch (DE); Thomas Brücher, Landsberg a. Lech (DE)

(73) Assignee: Hirschvogel Umformtechnik GmbH, Denklingen (DE)

( * ) Notice: Subject to any disclaimer, the term of this patent is extended or adjusted under 35 U.S.C. 154(b) by 0 days.

(21) Appl. No.: 15/466,981

(22) Filed: Mar. 23, 2017

(65) Prior Publication Data

US 2017/0276091 A1    Sep. 28, 2017

(30) Foreign Application Priority Data

Mar. 23, 2016   (DE) .................. 10 2016 204 859

(51) Int. Cl.
*F02F 3/00*     (2006.01)
*B23P 15/10*    (2006.01)

(52) U.S. Cl.
CPC .............. *F02F 3/003* (2013.01); *B23P 15/10* (2013.01); *F02F 3/0023* (2013.01); *F02F 3/0084* (2013.01); *F02F 2003/0053* (2013.01); *F02F 2003/0061* (2013.01); *F02F 2200/02* (2013.01)

(58) Field of Classification Search
CPC ........ F02F 3/003; F02F 3/0084; F02F 3/0023; F02F 2200/02; F02F 2003/0061; F02F 2003/0053
See application file for complete search history.

(56) References Cited

U.S. PATENT DOCUMENTS

| | | | |
|---|---|---|---|
| 6,223,701 B1 * | 5/2001 | Kruse .................. | F02F 3/003 123/41.35 |
| 7,341,037 B2 | 3/2008 | Parker et al. | |
| 7,464,684 B2 * | 12/2008 | Scharp ................. | F02F 3/0023 123/193.1 |
| 2012/0037112 A1 * | 2/2012 | Muscas ................ | F02F 3/003 123/193.6 |
| 2016/0025034 A1 | 1/2016 | Lormes | |

FOREIGN PATENT DOCUMENTS

FR    2918118 A1    1/2009
WO    2008148428 A1   12/2008

OTHER PUBLICATIONS

Machine translation of FR 2918118 to Boujon.

* cited by examiner

*Primary Examiner* — Jacob Amick
*Assistant Examiner* — Charles Brauch
(74) *Attorney, Agent, or Firm* — The H.T. Than Law Group

(57) ABSTRACT

The present invention relates to a multi-piece, in particular at least two-piece, piston (1) for an internal combustion engine having a longitudinal axis (L), comprising a piston outer part (10) having a closed piston head (11), which in the fitted state defines a combustion chamber, and a piston body (13) extending axially away from the piston head (11), and a piston inner part (20), which in the fitted state is connected to a connecting rod. An outer surface (2) radially defining the piston (1) is formed exclusively by at least one portion of the piston body (13) of the piston outer part (10). The piston inner part (20), viewed in an axial direction, is arranged radially entirely inside the piston body (13) or its circumferential surface.

17 Claims, 3 Drawing Sheets

SEGMENTED PISTON FOR INTERNAL COMBUSTION ENGINE

1. FIELD OF THE INVENTION

Figure 1:
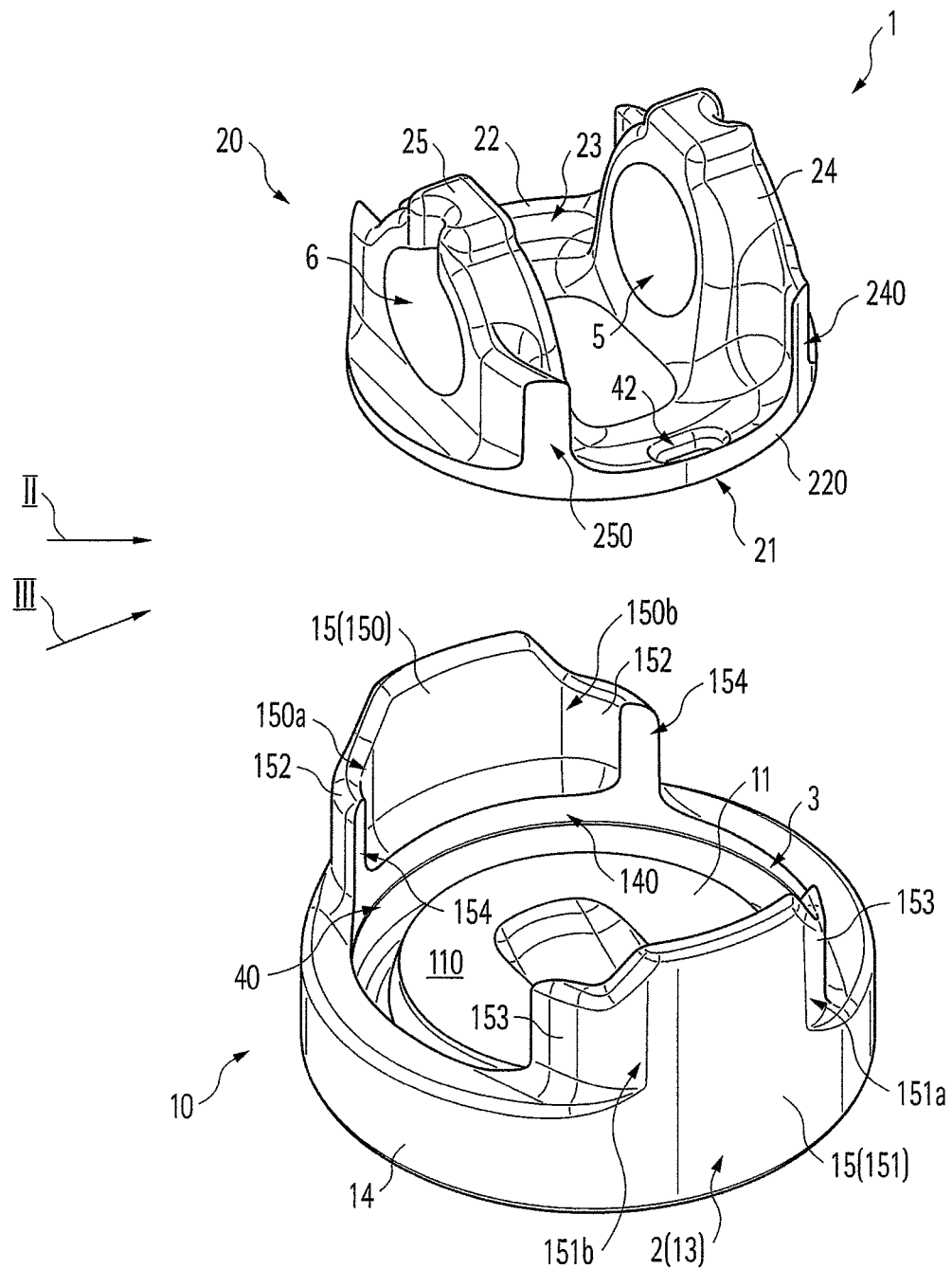

The present invention relates to a multi-piece piston for an internal combustion engine.

2. BACKGROUND OF THE INVENTION

Multi-piece, in particular two-piece, pistons for internal combustion engines are known in the prior art. DE 10 2013 218 764 A1, for example, discloses a two-piece piston, which is built up from a piston top part and a piston bottom part. With the two piston parts in the joined state, the configured parting surface gives rise to a joint, at least in the critical area of the piston rings or the piston skirt and possibly also in the particularly critical area of the piston head (combustion chamber recess, piston crown). Here multi-piece pistons according to the prior art are basically divided into piston top part and piston bottom part, the piston top part usually comprising the piston ring portion and the piston bottom part comprising the piston skirt. A joint or a gap therefore always results in an area of the outermost circumferential surface of the piston; for example between the piston ring portion and the piston skirt, or in the area of the piston rings. This joint or gap consequently lies in the area where the piston interacts with the cylinder wall of an internal combustion engine and close to the combustion chamber, in a thermally and mechanically highly stressed area of the piston. If a joint is provided in the piston head, this joint lies in an area subjected to particularly high thermal and mechanical stresses.

Proceeding from the prior art, the object of the present invention is to provide a multi-piece piston which affords an improved parting surface geometry.

These and other objects, which are yet to be stated in a reading of the following description or which may be clear to the person skilled in the art, are achieved by the subject matter of the independent claim. The dependent claims develop the central idea of the present invention in a particularly advantageous manner.

3. DETAILED DESCRIPTION OF THE INVENTION

According to a first aspect the present invention relates to a multi-piece, in particular a two-piece, piston for an internal combustion engine. The piston here usually has a longitudinal axis. The piston further comprises a piston outer part having a closed piston head, which in the fitted state defines a combustion chamber, and a piston body extending axially away from the piston head. In the context of the invention the term "closed" piston head is taken to mean, in particular, its integral and joint-free, that is to say one-piece configuration. In addition, the piston comprises a piston inner part. Which in the fitted state is connected to a connecting rod. An outer face radially defining the piston in relation to the longitudinal axis is formed exclusively by at least one portion of the piston body of the piston outer part. Viewed in an axial direction—that is to say in a line of sight onto the piston or along the longitudinal axis—the piston inner part is arranged radially entirely inside the piston body or its circumferential surface.

The embodiment according to the invention therefore provides a new type of joint variant of a multi-piece piston. Unlike the usual embodiment of a multi-piece piston having a piston top part and a piston bottom part, here a single piston outer part defining the outer or circumferential surface is provided, inside which—at least viewed in an axial direction—the piston inner part, intended for connection to a connecting rod, is arranged. A parting line therefore extends exclusively inside the outer circumferential surface of the piston and above all not up to the outside of the piston body—that is to say its circumferential surface—or of the piston head. This is achieved, in particular, due to the fact that the piston outer part is provided with the entire piston body or piston skirt and therefore the entire outer circumferential surface (=outer surface) of the piston showing, whilst the piston inner part is provided in order to afford a piston-pin hole fork radially inside the piston body, when viewed in a longitudinal direction. Any joint necessary is therefore situated outside the critical piston areas and above all not in the piston head or piston body.

The outer surface of the piston formed or defined by the piston body of the piston outer part preferably spans a cylinder, inside which the entire piston inner part is arranged. The cylindrical configuration allows an external geometry advantageously corresponding to a cylinder bore of an internal combustion engine, in order or afford a good sliding characteristic of the piston inside the cylinder.

The piston inner part is arranged, at least in part, radially inside the piston outer part, preferably radially inside the piston body or its circumferential surface. In this respect the piston inner part is at least in part accommodated in the piston outer part and therefore securely supported in the latter. A secure and compact piston geometry is therefore afforded.

Together with the piston head the piston body preferably forms a cavity, which is open on one side remote from the piston head and preferably substantially cylindrical, inside which cavity the piston inner part is at least partially accommodated. In this way it is possible to provide an easily produced geometry of the piston parts having an easily connected parting surface between the two piston parts.

In an especially preferred embodiment this parting surface between the piston outer part and the piston inner part is substantially U-shaped in cross section and furthermore is preferably formed so that it is mirror-symmetrical about the longitudinal axis. The portion of the piston outer part accommodating the piston inner part therefore substantially forms a type of "cup", in which the piston inner part can easily be correspondingly accommodated.

The piston outer part, in particular the piston body, preferably comprises a piston-ring zone extending axially away from the piston head, together with a piston skirt extending axially further from the piston-ring zone. The piston-ring zone and the piston skirt preferably form the piston body. Of the piston-ring zone and the piston skirt, at least one (preferably at least the piston skirt) forms the radially defining outer surface or the corresponding portion of the piston body of the piston. The piston-ring zone preferably comprises at least one, preferably at least two or three circumferential radial groove(s) for receiving a piston ring. In other words, the piston outer part forms all the radially external areas (for example piston head, piston body) of the piston. The piston rings used here are the compression rings facing towards the combustion chamber and the oil scraper rings remote from the combustion chamber. As a rule, two compression rings and one oil scraper ring are preferably provided. Since a parting line is now no longer present in or in proximity to the area of the piston-ring zone or of the piston skirt either, this results in greater degrees of freedom in the design of the piston-ring zone and in particular of the annular grooves receiving the piston rings.

In the assembled state the piston outer part and the piston inner part define a circumferential cooling duct. Here the cooling duct may be provided as a circumferential (axial) groove in the piston outer part facing the piston inner part. This is then bounded by a corresponding area—for example a plane face or also an annular groove open towards the piston head—of the side of the piston inner part facing the piston outer part, in order to form the cooling duct. A cooling duct of the piston can therefore be provided simply by joining the piston outer part and the piston inner part. The cooling duct can therefore be easily machined and provided without any undercut.

An end of the piston body, in particular the piston skirt, axially remote from the piston head may comprise multiple piston skirt areas distributed over the circumference. Here two or even more piston skirt areas are preferably formed, which are arranged so that they are distributed preferably uniformly over the circumference of the piston or piston outer part. Here the piston skirt areas, as outer surface of the piston or the circumferential surface of the piston body, accordingly follow the corresponding contour of the cylinder bore of a cylinder of an internal combustion engine, in order to ensure adequate guidance whilst at the same time saving material by virtue of the multi-piece formation.

At their opposite ends, viewed in a circumferential direction, the piston skirt areas preferably comprise reinforcing lands projecting radially to the longitudinal axis—that is to say inwards. These serve to stabilize the piston skirt areas, particularly during operation, in order to allow sufficiently precise guidance as they slide in a corresponding cylinder bore.

The piston inner part preferably comprises a base area facing the piston head, from which base area piston pin bosses extend on the side remote from the piston head in order to receive a piston pin connecting the piston to a connecting rod. The base area is preferably of a substantially annular formation. A geometrically simple, material-saving and technically efficient design of a piston inner part with piston-pin bearing is consequently provided, which is easy to insert into the piston outer part.

The piston inner part and in particular the base area may comprise a radially circumferential outer contact face, which is, at least in part, in flat contact with a radially circumferential inner contact face of the piston body and in particular of its piston-ring zone. In this way the piston inner part and the piston outer part can be easily and securely joined together. Since the joint or the parting surface is not exposed to any great tensile forces, here too a relatively small contact face suffices for connecting the piston outer part to the piston inner part.

The piston inner part and in particular the piston-pin bosses may comprise a radially outward facing support face, which is, at least in part, in flat contact with a radially inward facing support face of the piston body and in particular of its piston skirt or of the reinforcing lands. The supporting effect of the reinforcing lands may therefore, if necessary, be transmitted to the centrally situated piston inner part, so that an altogether stable piston body or piston skirt is provided; particularly if this is formed with multiple piston skirt areas.

The piston inner part and in particular the base area may comprise a first axial connection face, which faces the piston head and which is, at least in part, in flat contact with a second axial connection face of the piston outer part, and in particular of the piston head, facing the piston inner part. In this way a relatively extensive contact area is provided for the formation of a joint or parting surface of the two piston parts, in order to afford a secure connection of the piston parts, and in particular in order to absorb tensile forces.

The piston outer part and the piston inner part may be detachably or permanently connected to one another. A screwed connection (by means of a thread, bayonet connection and the like), a latching connection (for example by means of latching projections and catches) and the like, for example, may serve as a detachable method of connection. A soldered connection, a welded connection, an adhesively bonded connection or a riveted connection, for example, are feasible as a permanent method of connection. Joining by shrinking on or shrinking in, or a (radial) press fit is also feasible. Any combination of the aforementioned methods of connection is also feasible.

The multi-piece configuration of the piston makes it possible to produce the piston outer part and the piston inner part from different materials. Since the piston outer part comprises all of the heavily stressed areas of the piston, that is to say the surfaces assigned or corresponding to the combustion chamber and the cylinder wall, the piston outer part may preferably be made from metal, in particular steel such as high-temperature resistant steel. The piston inner part, preferably screened by the piston outer, part may then be made from another material, which is in particular selected the mechanical stresses in the interaction with the crankshaft connected by way of the connecting rod. Thus the piston inner part may be made of metal, for example, such as steel or non-ferrous or metals or also of plastic, such as fiber-reinforced plastics, for example.

According to a further aspect, the invention is also directed towards a method for the manufacture of a piston according to the invention, in which the piston outer part and the piston inner part are first provided, and the piston inner part then inserted into the piston outer part, before finally connecting, in particular joining, the two piston parts together.

4. DESCRIPTION OF A PREFERRED EMBODIMENT

Figure 2:
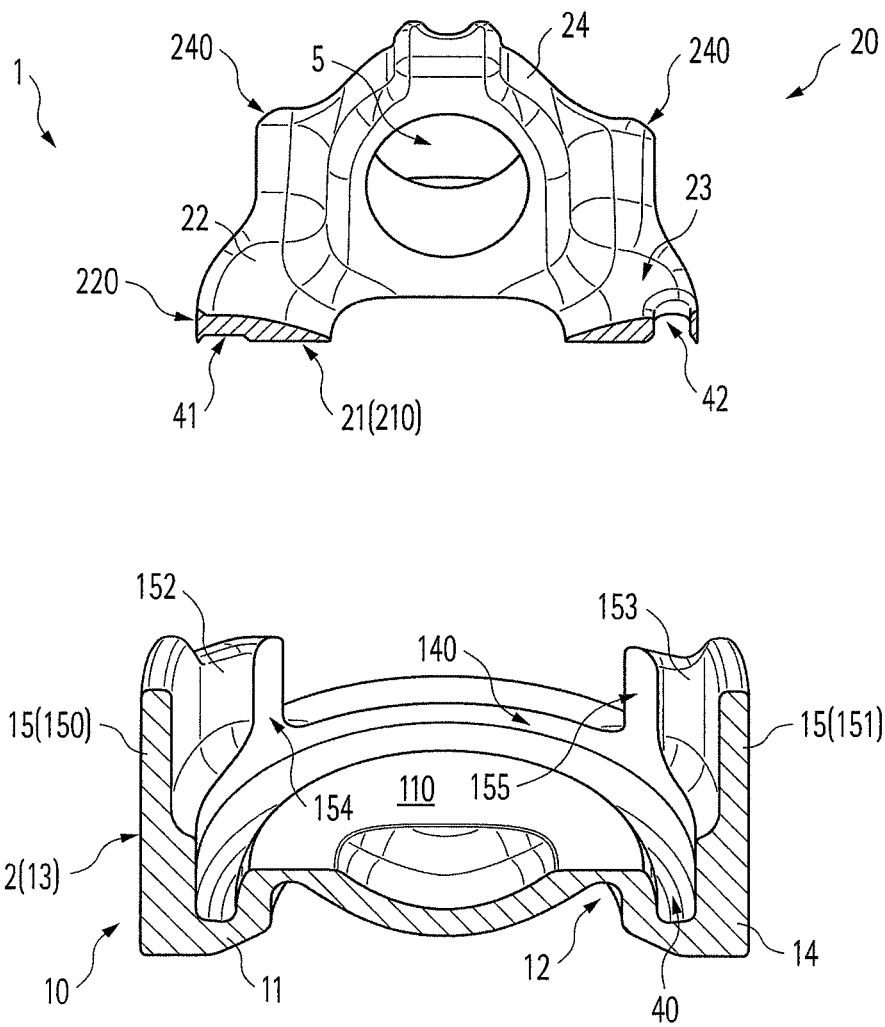
Figure 3:
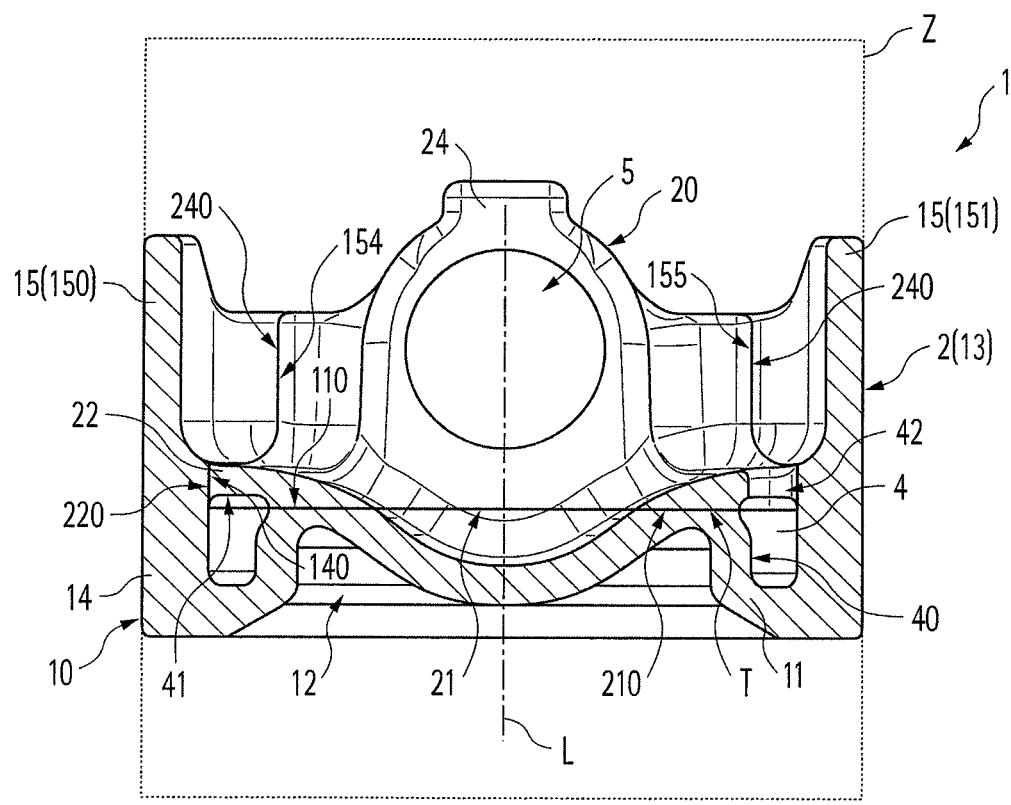

Further embodiments and advantages of the present invention are described below with reference to an exemplary embodiment according to the figures of the accompanying drawings, of which:

FIG. 1 shows a perspective, exploded view of one exemplary embodiment of a piston according to the invention, FIG. 2 shows a perspective sectional view of the piston according to FIG. 1 in an exploded representation viewed in the direction II according to FIG. 1, and FIG. 3 shows a sectional side view of the piston according to FIG. 2 viewed in the direction III according to FIG. 1.

The figures show a multi-piece piston 1 according to the invention for an internal combustion engine. As shown in FIG. 3, the piston 1 has a longitudinal axis L. This corresponds to the stroke axis of the piston 1 in a cylinder of an internal combustion engine during operation.

The piston 1 represented here comprises two piston parts 10, 20. The one part is a piston outer part 10 having a closed piston head 11, which in the fitted state—that is to say inserted into a cylinder bore of a cylinder of an internal combustion engine—defines a combustion chamber. As already mentioned, in the context of the invention the term "closed" is taken to mean that the piston head 11 is provided in one piece and in particular without joints. The piston head 11 preferably comprises a combustion chamber recess 12. It is also feasible, however, for the piston head 11 to be formed with a piston top or piston crown, according to its intended use. The piston outer part 10 further comprises a piston body 13 extending axially away from the piston head 11—that is to say in the direction of the longitudinal axis L. As can be seen, in particular, from FIG. 3, an outer surface 2 radially defining the piston 1 in relation to the longitudinal axis L—that is to say a circumferential surface of the piston body 13—is formed exclusively by at least one portion of the piston body 13 of the piston outer part 10. The piston outer part 10 therefore forms all the radially external areas or effective surfaces of the piston 1.

In particular, the piston outer part 10, preferably the piston body 13, may comprise a piston-ring zone 14 extending axially away from the piston head 11, together with a piston skirt 15 extending axially further from the piston-ring zone 14. The piston-ring zone 14 and the piston skirt 15 here preferably form the piston body 13. Of the piston-ring zone 14 and the piston skirt 15, at least one forms the radially defining outer surface 2 of the piston 1. Although not shown in the figures, the piston-ring zone 14 in the usual way may have at least one, preferably at least two and more preferably at least three circumferential radial grooves, each intended to receive a piston ring. Usually the piston-ring zone accordingly comprises three annular grooves spaced in an axial direction, the two annular grooves facing the piston head 11 serving to receive compression rings and the annular groove remote from the piston head 11 serving to receive an oil scraper ring.

The piston outer part 10 is preferably made from metal, in particular steel such as high-temperature resistant steel. In particular, the piston outer part 10 is made from a material which is selected according to the functional demands. For example, this material must be correspondingly high-temperature resistant, in order to withstand the given temperatures and temperature fluctuations emanating from the combustion chamber, in addition, the piston outer part 10, at least in the area of its outer surface 2—that is to say in the area of the piston body 13—must be wear-resistant, in order to ensure durable use in its interaction with the cylinder wall of the internal combustion engine during the life cycle of the internal combustion engine. In principle it is also feasible to suitably treat the corresponding areas of the piston outer part 10, that is to say the piston head 11 on the one hand and the piston body 13 on the other; for example by hardening or coating.

Secondly the piston 1 comprises a piston inner part 20, which in the fitted state is connected to a connecting rod. The piston inner part 20 may be made from a metal, such as steel or non-ferrous metal, or also from plastic, such as fiber-reinforced plastics. In particular, it is advantageous, given the multi-piece configuration of the piston 1, to produce the two piston parts 10, 20 preferably from different materials, which are ideally selected according to the respective requirements of the two piston parts 10, 20.

Viewed in an axial direction—that is to say in the direction of the longitudinal axis L—the piston inner park 20 is arranged radially entirely inside the piston body 13, as can be seen, in particular, from FIG. 3. This is a reliable way of ensuring that a joint or parting surface T between the piston parts 10, 20 is provided outside the critical areas (in this case the outer surface 2 of the piston 1 formed by the piston body 13, and the piston head 11). Moreover, a corresponding joint or parting surface T provided is still easily accessible. As can be seen in FIG. 3, the parting surface T between the piston outer part 10 and the piston inner part 20 is substantially U-shaped in cross section and more preferably formed so that it is mirror-symmetrical about the longitudinal axis L. The most extensive possible parting surface T is therefore provided outside the critical areas of the piston 1, in order to connect the two joined piston parts 10, 20 securely together and to keep them connected.

The outer surface 2 of the piston 1 formed by the piston body 13 of the piston outer part 10 preferably spans a cylinder Z, as is shown by way of example in FIG. 3. As can be seen from this figure, the entire piston inner part 20 here is preferably arranged inside this cylinder Z. The cylindrical configuration therefore lends the piston outer part 10 or piston body 13 a shape suitable for guiding it inside a cylinder bore of a cylinder of a internal combustion engine, whilst at the same time the piston inner part 20 is securely accommodated inside this cylinder Z—that is to say inside the piston body 13—in order to avoid joints on external edge areas of the piston outer part 10 both radially laterally (that is on the part of the piston body 13) and axially on the part of the piston head 11. The piston inner part 20 may be arranged, at least in part, radially inside the piston outer part 10 and preferably radially inside the piston body 13, as is illustrated by way of example in FIG. 3. The piston inner part 20 is therefore securely accommodated, at least in part, inside the piston outer part 10 and is therefore preferably shielded from the critical areas of the piston 1. This allows a high degree of variation in the design (geometry, choice of material, etc.) of the piston inner part 20, since this is isolated from the critical areas of the piston 1, particularly in the interaction with a cylinder bore and a combustion chamber.

The piston body 13 together with the piston head 11 preferably forms a cavity 3, open on one side remote from the piston head 11—that is to say substantially cup-shaped—and preferably substantially cylindrical, as can be seen in particular in FIG. 1. The piston inner part 20 is at least partially accommodated inside this cavity 3 and is therefore securely held inside the piston outer part 10. Joining of the two piston parts 10, 20 is moreover easy to accomplish.

As can be seen in particular from FIG. 1, an end of the piston body 13, here in particular the piston skirt 15, axially remote from the piston head 11, comprises multiple piston skirt areas 150, 151 distributed over the circumference. According to the embodiment, two piston skirt areas 150, 151 are provided. Which are preferably situated opposite one another. In particular, the piston skirt areas 150, 151 are preferably arranged, uniformly distributed over the circumference of the piston 1 or of the piston outer part 10. In this way a material-saving and at the same time secure guidance of the piston 1 in a cylinder of an internal combustion engine is ensured.

The piston skirt areas 150, 151 furthermore preferably comprise reinforcing lands 152, 153, projecting radially in relation to their circumferential direction—that is to say inwards—at their opposite ends 150a, 150b, 151a, 151b. These lands serve, in particular, to stabilize the piston skirt areas 150, 151 in their interaction with the inside wall of a cylinder—that is to say the cylinder bore—of an internal combustion engine during operation.

As can be seen in particular from FIG. 1, the piston inner part 20 comprises a base are 22 facing the piston head 11. This base area 22 is preferably of a substantially annular formation. From the base area 22 piston-pin bosses 24, 25 extend on the side 23 remote from the piston head 11 in order to accommodate a piston pin connecting the piston 1 to a connecting rod. For this purpose the piston-pin bosses 24, 25 each comprise a piston-pin bore 5, 6.

The piston inner part 20, in particular its base area 22, comprises a radially circumferential outer contact face 220, in particular for connecting or joining the two piston parts 10, 20. This face is preferably of a closed, circumferentially annular formation. This outer contact face 220 is preferably, at least in part, in flat contact with a radially circumferential inner contact face 140 of the piston body 13, preferably of the piston-ring zone 14.

The piston inner part 20, in particular the piston-pin bosses 24, 25, may comprise a radially outward facing support face 240, 250 which, at least in part, is in flat contact with a radially inward facing support face 154, 155 of the piston body 13, preferably of the piston skirt 15 and in particular of the reinforcing lands 152, 153. This can be seen, in particular, from the sectional representation in FIG. 3. In this way the reinforcing lands 152, 153 and in particular the piston body 13 are securely supported inwardly, preferably at least in the area of the piston skirt 15, in order to also stabilize the piston body 13 as a whole during operation.

The piston inner part 20, in particular the base area 22, preferably comprises a first axial connection face 210, which faces the piston head 11 and which, at least in part, is in flat contact with a second axial connection face 110 of the piston outer part 10, preferably of the piston head 11, facing the piston inner part 11. As can be seen from the figures, this allows the formation of the most extensive possible parting surface T between the piston parts 10, 20, in order to connect these securely together. In particular, the parting surface T formed in this way is sufficient for a secure connection of the piston parts 10, 20 in the piston 1 only exposed to small tensile forces.

The piston outer part 10 and the piston inner part 20 may be connected to one another, for example, via their inner and outer contact face 140, 220 and/or their support faces 154, 155, 240, 250 and/or their axial connection faces 110, 210. The piston parts 10, 20 are preferably detachably or also permanently connected to one another. Detachable methods of connection include, in particular, a screwed connection or a latching connection. Permanent methods of connection are a soldered connection, a welded connection, an adhesively bonded connection or a riveted connection, for example. Shrinking the piston inner part 20 into the piston outer part 10 or shrinking the piston outer part 10 onto the piston inner part 20 or a (radial) press-fitting of the piston parts 10, 20, particularly in the area of the inner and outer contact faces 140, 220 is also feasible. Any combination of the aforementioned methods of connection is feasible.

As can be seen from FIG. 3 in particular, the piston outer part 10 and the piston inner part 20 in the assembled or joined state define a circumferential cooling duct 4. Here the cooling duct 4 may be provided as an axial or circumferential groove 40 in the piston outer part 10, facing the piston inner part 20. This groove 40 is then bounded by a corresponding and preferably likewise circumferential area 41 of the side 21 of the piston inner part 20 facing the piston outer part 10, precisely in order to form the closed circumferential cooling duct 4. Here the area 41 may also be provided as a circumferential (axial) groove facing the piston head 11, as shown in FIG. 3.

The piston 1 preferably comprises openings or bores (oil bores) 42 extending away from the cooling duct 4 and serving to deliver and remove a coolant, such as, in particular, engine oil. In addition to the one opening 42 shown, further opening are preferably feasible. The opening 42 here preferably extends from the area 41 in a direction away from the piston head 11. For this purpose the opening 42 is preferably formed in the piston inner part 20 and in operation affords the cooling duct 4 a fluid connection to a chamber, which is remote from the combustion chamber and via which the coolant is provided. The opening 42 is preferably provided at a radial distance inwards from the contact face 220. The opening 42 may, however, also interrupt the outer contact face 220. This interruption, however, has no appreciable effect, if any, on the action of the at least partial flat contact between the outer contact face 220 of the piston inner part 20 or of the base area 22 on the one hand, and the inner contact face 140 of the piston body 13 or of the piston-ring zone 14 on the other.

A method for the manufacture of a multi-piece piston 1 according to the invention is described below. In a first step a piston outer part 10 and a piston inner part 20, as have been described previously, are provided. For this purpose the piston parts 10, 20 are preferably produced by a method of forming, for example forging. The geometric configuration of the piston parts 10, 20 previously described makes the manufacture of these parts especially easy, with an easily accessible parting surface T for connecting the piston parts 10, 20. Alternatively or in addition, however, it is also feasible for the piston parts 10, 20 to be provided by means of casting, sintering or machining methods. All in all, the piston outer part 10 and the piston inner part 20 can be provided by means of casting or sintering, forming and/or machining methods.

In a second step the piston inner part 20 is preferably inserted into the piston outer part 10. Inserting the piston inner part 20 into the piston outer part 10 preferably serves to form or provide the cooling duct 4 between the piston outer part 10 and the piston inner part 20.

Finally the piston parts 10, 20 are connected together. As already described previously, the piston outer part 10 and the piston inner part 20 are detachably or permanently connected to one another, preferably (radially) pressed, screwed, latched, soldered, welded, adhesively bonded and/or riveted together.

The present invention is not limited to the exemplary embodiment of a multi-piece piston 1 according to the invention shown above, as long as it is encompassed by the subject matter of the following claims. In particular, the features of the present invention are interchangeable and may be combined with one another in any chosen manner.

The invention claimed is:

1. Multi-piece piston (1) for an internal combustion engine having a longitudinal axis (L), comprising:
   a piston outer part (10) having a closed piston head (11), which in the fitted state defines a combustion chamber, and a piston body (13) extending axially away from the piston head (11); and
   a piston inner part (20), which in the fitted state is connected to a connecting rod;
   wherein an outer surface (2) radially defining the piston (1) is formed exclusively by at least one portion of the piston body (13) of the piston outer part (10), wherein the piston inner part (20), viewed in an axial direction, is arranged radially entirely inside the piston body (13),
   wherein an end of the piston body (13) axially remote from the piston head (11), comprises multiple piston skirt areas (150, 151) distributed over the circumference,
   wherein the piston skirt areas (150, 151), at their opposite ends (150a, 150b, 151a, 151b), viewed in a circumferential direction, comprise reinforcing lands (152, 153) projecting radially towards the longitudinal axis (L), and wherein the piston inner part (20) comprises a radially outward facing support face (240, 250), which is, at least in part, in flat contact with a radially inward facing support face (154, 155) of reinforcing lands (152, 153).

2. Piston (1) according to claim 1, wherein the outer surface (2) of the piston (1) formed by the piston body (13) of the piston outer part (10) spans a cylinder, inside which the entire piston inner part (20) is arranged.

3. Piston (1) according to claim 1, wherein the piston inner part (20) is arranged, at least in part, radially inside the piston outer part (10), preferably radially inside the piston body (13) or its circumferential surface.

4. Piston (1) according to claim 1, wherein the piston body (13) together with the piston head (11) forms a cavity (3), which is open on one side remote from the piston head (11) and preferably substantially cylindrical, inside which cavity the piston inner part (20) is at least partially accommodated.

5. Piston (1) according to claim 1, wherein a parting surface (T) between the piston outer part (10) and the piston inner part (20) is substantially U-shaped in cross section and furthermore is preferably formed so that it is mirror-symmetrical about the longitudinal axis (L).

6. Piston (1) according to claim 1, wherein the piston outer part (10), in particular the piston body (13), comprises a piston-ring zone (14) extending axially away from the piston head (11), together with a piston skirt (15) extending axially further from the piston-ring zone (14), wherein of the piston-ring zone (14) and the piston skirt (15), at least one forms the radially defining outer surface (2) of the piston (1).

7. Piston (1) according to claim 6, wherein the piston-ring zone (14) comprises at least one, preferably at least two circumferential radial groove(s) for receiving a piston ring.

8. Piston (1) according to claim 1, wherein the piston outer part (10) and the piston inner part (20) in the in the assembled state define a circumferential cooling duct (4).

9. Piston (1) according to claim 8, wherein the cooling duct (4) is provided as a circumferential groove (40) in the piston outer part (10) facing the piston inner part (20), which groove is then bounded by a corresponding area (41) of the side (21) of the piston inner part (20) facing the piston outer part (10).

10. Piston (1) according to claim 1, wherein the end of the piston body (13) comprises a piston skirt (15).

11. Piston (1) according to claim 1, wherein the piston inner part (20) comprises a base area (22) facing the piston head (11), in particular a substantially annular base area (22), from which piston pin bosses (24, 25) extend on a side (23) remote from the piston head (11), in order to receive a piston pin connecting the piston (1) to a connecting rod.

12. Piston (1) according to claim 11, wherein the piston inner part (20), in particular the base area (22), comprises a radially circumferential outer contact face (220), which is, at least in part, in flat contact with a radially circumferential inner contact face (140) of the piston body (13), preferably of the piston-ring zone (14).

13. Piston (1) according to claim 1, wherein the piston inner part (20) comprises piston-pin bosses (24, 25).

14. Piston (1) according to claim 11, wherein the piston inner part (20), in particular the base area (22), comprises a first axial connection face (210), which faces the piston head (11) and which is, at least in part, in flat contact with a second axial connection face (110) of the piston outer part (10), preferably of the piston head (11), facing the piston inner part (11).

15. Piston (1) according to claim 1, wherein the piston outer part (10) and the piston inner part (20) are detachably or permanently connected together, preferably by means of a press-fit, screwed connection, latching connection, soldered connection, welded connection, adhesively bonded connection and/or riveted connection.

16. Piston (1) according to claim 1, wherein the piston outer part (10) is made from metal, in particular steel such as high-temperature resistant steel.

17. Piston (1) according to claim 1, wherein the piston inner park (20) is made from metal, such as steel or non-ferrous metals, or plastic, such as fiber-reinforced plastics.

* * * * *